Patented June 1, 1948

2,442,461

UNITED STATES PATENT OFFICE 2,442,461

STABLE SOLUTIONS OF CALCIUM ASCORBATE

Walter Karrer, Riehen, near Basel, Switzerland, assignor to Hoffmann-La Roche Inc., Nutley, N. J., a corporation of New Jersey No Drawing. Application February 7, 1945, Serial No. 576,715. In Switzerland March 9, 1944

4 Claims. (Cl. 167—81)

For certain therapeutic purposes, particularly in the case of injections, the simultaneous administration of ascorbic acid and calcium is desirable since these substances have a synergistic action. Whereas calcium ascorbate is easily soluble in water, the solution is only stable for a limited period. After some time the very difficultly soluble calcium oxalate precipitates. Even if the aqueous solution of calcium ascorbate is filled into ampoules while keeping out the air as far as possible, the ultimate formation of calcium oxalate cannot be completely avoided. In view of such deposits the employment of ampoules for injection purposes is rendered practically impossible.

It has now been found that stable solutions of calcium ascorbate can be obtained by adding an aliphatic thiocarboxylic acid to an aqueous solution of ascorbic acid calcium salt. The execution of the invention may, for instance, be effected by adding ascorbic acid to an aqueous suspension of calcium carbonate, filtering the solution, adding to the filtrate an aliphatic thiocarboxylic acid (e. g., thioglycolic acid, thiolactic acid or cystein) and having, if necessary driven out the air from the solution, filling the latter into ampoules under exclusion of air. In order to arrive at the desired end the addition of only a small quantity of thiocarboxylic acid, e. g., 0.5 to 2% of the total solution is required. Prior to filling the solution into ampoules, it is advisable to give the solution an acidity of pH 5.2 to 5.6.

Example 1

3.75 parts by weight of pure calcium carbonate are added to 300 parts of redistilled water, which has been saturated with carbon dioxide, and the solution is heated to 60° C. on a water bath while stirring. 13.2 parts by weight of ascorbic acid are then introduced in portions and the solution, when still warm, is passed through a dense filter while fumigating with carbon dioxide. Directly after the filtration, 0.3 part by weight of thioglycolic acid and 0.06 part by weight of ascorbic acid are dissolved in the filtrate. After renewed filtration through a dense filter the absolutely clear solution is filled into ampoules while fumigating with carbon dioxide. The solution contains 5 per cent. by volume of calcium ascorbate; pH of the solution 5.3 to 5.4.

Example 2

3.75 parts by weight of pure calcium carbonate are added to 310 parts of redistilled water, which has been saturated with carbon dioxide, and the solution is heated to 60° C. on a water bath while stirring. Then, 13.2 parts by weight of ascorbic acid are introduced in portions and the solution, when still warm, is passed through a dense filter while fumigating with carbon dioxide. Immediately after filtration, 0.6 part by weight of cystein hydrochloride and 0.06 part by weight of ascorbic acid are dissolved in the filtrate. After repeating the filtration through a dense filter, 10 parts of water are distilled off from the solution in vacuo at 30–35° C., suitably while allowing a weak current of $CO_2$ to pass through. The clear and practically completely deaerated solution is filled into ampoules while fumigating with carbon dioxide. The solution contains 5 per cent. by volume of calcium ascorbate; the solution has a pH of 5.4.

I claim:

1. A stable aqueous solution of calcium ascorbate, containing as essential ingredients a major proportion of calcium ascorbate, and a minor proportion of thioglycolic acid, said solution having a pH of 5.2 to 5.6.

2. A stable aqueous solution of calcium ascorbate, containing as essential ingredients a major proportion of calcium ascorbate, and a minor proportion of cystein hydrochloride, said solution having a pH of 5.2 to 5.6.

3. A stable aqueous solution of calcium ascorbate, containing as essential ingredients a major proportion of calcium ascorbate, and a minor proportion of thiolactic acid, said solution having a pH of 5.2 to 5.6.

4. A stable aqueous solution of calcium ascorbate, containing as essential ingredients a major proportion of calcium ascorbate and a minor proportion of an aliphatic thiocarboxylic acid as a stabilizing agent, said solution having a pH of 5.2 to 5.6.

WALTER KARRER.

REFERENCES CITED

The following references are of record in the file of this patent:

UNITED STATES PATENTS

| Number | Name | Date |
| --- | --- | --- |
| 2,201,929 | Speakman | May 21, 1940 |
| 2,283,817 | Martin et al. | May 19, 1942 |

FOREIGN PATENTS

| Number | Country | Date |
| --- | --- | --- |
| 488,784 | Great Britain | July 13, 1938 |

OTHER REFERENCES

Manufacturing Chemist, May 1942, p. 125 (167–81, box 9). (Copy in Div. 43.)

McFarlane-Biochemical Journal, vol. 30, pages 1476, 1477 (1936). (Copy in Sci. Lib.)

Mawson-Biochemical Journal, vol. 29, pp. 575, 576, 579 (1935). (Copy in Sci. Lib.)

Ku-Chemical Abstracts, vol. 34, p. 3328 (1940). (Copy in Sci. Lib.)